United States Patent
Koniakowsky et al.

(10) Patent No.: US 10,333,441 B2
(45) Date of Patent: Jun. 25, 2019

(54) METHOD FOR REGULATING A SPEED OF AN ELECTRIC MOTOR OF A POWER TOOL

(71) Applicant: Robert Bosch GmbH, Stuttgart (DE)

(72) Inventors: Joerg Koniakowsky, Ostfildern (DE); Stefan Mock, Remshalden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/724,352

(22) Filed: Oct. 4, 2017

(65) Prior Publication Data
US 2018/0115266 A1    Apr. 26, 2018

(30) Foreign Application Priority Data
Oct. 21, 2016    (DE) .......................... 10 2016 220 716

(51) Int. Cl.
*G05B 19/414*    (2006.01)
*H02P 7/20*    (2006.01)
(Continued)

(52) U.S. Cl.
CPC ............... *H02P 7/20* (2013.01); *B23B 45/02* (2013.01); *B25B 21/008* (2013.01);
(Continued)

(58) Field of Classification Search
CPC ...... H02P 1/00; H02P 3/00; H02P 6/00; H02P 1/04; H02P 21/00; H02P 21/0021; H02P 23/0027; H02P 25/145; H02P 7/20; H02P 1/46; H02P 3/18; H02P 41/00; H02P 41/02; H02P 1/26; H02P 1/42; H02P 1/24; H02P 1/465; H02P 4/00; H02P 5/00; H02P 6/04; H02K 7/145; H02K 11/30; H02K 23/66; H02K 27/10; G05B 2219/41378; G05B 2219/41389; G05B 19/414
(Continued)

(56) References Cited

U.S. PATENT DOCUMENTS 3,585,476 A * 6/1971 Rutchik .................. H02P 7/295
318/249
6,431,289 B1 * 8/2002 Potter ................... B23B 45/008
173/216
(Continued)

FOREIGN PATENT DOCUMENTS

DE    102011007648 A1    10/2012
DE    202013100915 U1    6/2013
(Continued)

*Primary Examiner* — Antony M Paul
(74) *Attorney, Agent, or Firm* — Norton Rose Fulbright US LLP; Gerard Messina (57) ABSTRACT

A method for regulating a speed of an electric motor of a power tool, the speed of the electric motor being established as a function of an actuation of a control device, the control device being actuated in such a way that a speed is requested which is less than a maximum speed, the speed being set in such a way that, in a first speed range upon an increase of the torque output by the electric motor, the speed decreases with a first negative slope, the speed being set in a second speed range in such a way that the speed proceeds with a second slope upon an increase of the output torque, the second slope being greater than the first slope when considered mathematically.

24 Claims, 5 Drawing Sheets

(51) Int. Cl.
*B23B 45/02* (2006.01)
*B25B 21/00* (2006.01)
*H02K 11/30* (2016.01)
*H02K 23/66* (2006.01)
*B25B 23/147* (2006.01)
*H02P 6/28* (2016.01)
*H02K 7/14* (2006.01)
*B25F 5/00* (2006.01)

(52) U.S. Cl.
CPC .............. *B25B 23/147* (2013.01); *B25F 5/00* (2013.01); *G05B 19/414* (2013.01); *H02K 7/145* (2013.01); *H02K 11/30* (2016.01); *H02K 23/66* (2013.01); *H02P 6/28* (2016.02)

(58) Field of Classification Search
USPC ............ 318/400.01, 400.02, 400.14, 400.07, 318/400.15, 700, 701, 727, 779, 799, 800, 318/801, 430, 432, 437
See application file for complete search history.

(56) References Cited

U.S. PATENT DOCUMENTS

| | | | |
|---|---|---|---|
| 7,101,300 B2 * | 9/2006 | Milbourne | ............ B23B 45/008 475/265 |
| 2014/0374131 A1 * | 12/2014 | Hirabayashi | .......... B25B 21/008 173/181 |

FOREIGN PATENT DOCUMENTS

| | | |
|---|---|---|
| EP | 2716407 A1 | 4/2014 |
| WO | 2011004902 A1 | 1/2011 |

* cited by examiner

METHOD FOR REGULATING A SPEED OF AN ELECTRIC MOTOR OF A POWER TOOL

CROSS REFERENCE

The present application claims the benefit under 35 U.S.C. § 119 of German Patent Application No. DE 102016220716.4 filed on Oct. 21, 2017, which is expressly incorporated herein by reference in its entirety.

FIELD

The present invention relates to a method for regulating a speed of an electric motor of a power tool, a control unit, and a power tool.

BACKGROUND INFORMATION

Setting the power of an electric motor of a power tool as a function of an actuation of a control device of the power tool is conventional. The speed decreases with increasing load torque.

SUMMARY

An object of the present invention is to provide an improved method for regulating the speed of an electric motor of a power tool, an improved control unit, and an improved power tool.

The objects may be achieved in accordance with the present invention. Advantageous specific embodiments of the present invention are described herein.

A method is provided for regulating a speed of an electric motor of a power tool, the speed of the electric motor being established as a function of an actuation of a control device by an operator. The control device is actuated in such a way that a speed is requested which is less than a maximum speed. Therefore, a maximum power of the electric motor is not requested, but rather power reserves are still present. The speed is set in such a way that the speed decreases with a first slope in a first speed range with an increase of the torque output by the electric motor. Moreover, the speed is set in a second speed range in such a way that the speed decreases with a second slope with an increase of the output torque, the second slope being greater than the first slope when considered mathematically. It is therefore possible to provide a speed adapted to the high torque, in particular in the case of high torques and low speeds.

This method may be used, for example, when screwing a screw into a workpiece. In the case of a screw almost countersunk into the workpiece, the screw is screwed in further at a reduced speed during the continued screwing in of the screw and countersunk in the workpiece. Due to the reduced speed with maximum possible torque at the same time, the work procedure is carried out more slowly and sufficient reaction time remains for the operator to turn it off himself/herself after achieving the desired result. This may be, for example, the exact screw-in depth of a screw into a piece of wood or achieving a tightening torque perceived by the operator.

Moreover, problems during the screwing in, which may be produced, for example, by variations of the load torques, may be compensated for using the described method. The load torques may be produced, for example, by different material properties of the workpiece.

Moreover, the method may be used when unscrewing a screw, in particular when loosening a screw from a workpiece. With the aid of the described method, the torque is increased more slowly than in the related art and the operator has the option of reducing the speed and the torque by changing the actuation of the control device. Damage to the screw may thus be avoided.

One feature of the present invention is that the setpoint speed of the power tool is settable in a familiar manner by an operator via the control device. Thus, in the case of idling (output torque=0 N m), an arbitrary speed between 0 RPM and a maximum possible speed may be selected. At higher speeds, the speed drops in a routine manner due to the load torque, whereby the operator, in particular in the case of high speeds and small torques (for example, cordless screwdriver in the fastest gear), receives feedback about the present torque via the audible speed drop.

In one embodiment, when the speed falls below a threshold speed, the speed is kept constant at a lower level by the regulator. It is therefore made possible for the operator to intentionally switch off at the desired torque or a desired screw-in depth.

A speed regulator is activated in the case of a speed set by the operator via the control element which is less than the threshold speed. In this way, it is possible to turn a screw a few degrees further even at a minimal speed, even if this screw has already been almost countersunk.

In one embodiment, the speed increases with the first slope in the first speed range upon a decrease of the output torque and the speed extends with the second slope in the second speed range upon a decrease of the output torque.

In one embodiment, the speed is kept approximately constant in the second speed range, so that the second slope has a value of zero. A further improvement of the screw-in procedure may thus be achieved.

In one embodiment, a third speed range is provided, the speed being set in the third speed range in such a way that it drops with a third slope with an increase of the output torque, the third slope having a different value than the second slope. The screw-in behavior may thus be adapted more individually to various speed ranges.

In one embodiment, a fourth speed range is provided, the speed of the electric motor being set in the fourth speed range in such a way that the change of the speed with an increase of the output torque is less than in the second speed range.

In one embodiment, the change of the speed with the increase of the torque is a function of an operating parameter of the power tool. A more accurate adaptation of the speed to the operating situation may thus be achieved. In particular, in the case of drill screwdrivers, which have a mechanical transmission ratio, in which the transmission ratio is easy to change by the operator, the method may be adapted to the different output speeds at the screw and therefore adapted to the optimum condition. This is advantageous in particular in a power tool which has a mechanical transmission ratio which uniformly transmits the motor torque to the output spindle.

In one embodiment, a threshold speed is provided, the threshold speed delimiting two speed ranges from one another, in particular the first and the second speed ranges. With the aid of the threshold speed, an accurate delimitation may be performed between the speed ranges and the different slopes of the speeds with decreasing torque, i.e., load torque.

In one embodiment, the threshold speed is dependent on an operating parameter of the power tool. A more precise adaptation of the slopes of the speed is thus achieved.

In one embodiment, the operating parameter represents a transmission ratio of a transmission of the power tool.

In one embodiment, the operating parameter represents an actuation of the control device of the power tool.

In one embodiment, the operating parameter represents a voltage of a power supply of the electric motor, in particular a voltage of a battery.

In one embodiment, the operating parameter represents a temperature of the power tool, in particular a temperature of the battery, the electronics, and/or the electric motor.

In one embodiment, the threshold speed or the ratio between the speed and the output torque may be changed via an actuation of an operating element on the power tool. The operating element may be designed, for example, as a pushbutton or a setting wheel.

In one embodiment, the threshold speed or the ratio between the speed and the output torque may be changed via a communication interface. In one embodiment, the threshold speed or the ratio between speed and output torque may be set via an electronic device, which communicates via a cable or a wireless connection with the power tool.

In addition, a control unit is provided, which is designed to regulate an electric motor of the power tool according to the present invention.

In one embodiment, the control unit includes a speed regulator, a setpoint current limiter, and a current regulator.

In one embodiment, the control unit includes a signal processing unit, the signal processing unit detecting a current intensity output to the electric motor. Moreover, the signal processing unit detects a signal for establishing a speed of the electric motor. Furthermore, the signal processing unit relays the value of the output current of the power electronics to the current regulator. The signal processing unit ascertains a value for the speed of the electric motor. For this purpose, a speed sensor may be provided or the speed is estimated on the basis of at least one measured parameter, for example, the current of the electric motor. The signal processing unit relays the value for the speed to the speed regulator and to the setpoint current limiter, a setpoint speed being ascertained by the signal processing unit as a function of the actuation of a control device and the setpoint speed being relayed to the speed regulator. The speed regulator ascertains a setpoint current as a function of a comparison of the ascertained speed and the setpoint speed. The setpoint current is relayed via a fifth control line to the setpoint current limiter. The setpoint current limiter ascertains a value for the setpoint current as a function of the ascertained speed and the measured current and relays the value for the setpoint current to the current regulator.

In another embodiment, the signal processing unit detects a voltage of the current/voltage source and relays the value of the detected voltage to the current regulator and the setpoint current limiter. The setpoint current limiter ascertains a value for the setpoint current as a function of the ascertained speed, the measured voltage, and the measured current.

In one embodiment, the setpoint current limiter accesses data of a data memory and takes into consideration the predefined speed ranges, in which a predefined behavior of the speed is predefined as a function of the torque, in particular a predefined slope of the speed with an increase or decrease of the torque.

In one embodiment, the power tool includes a transmission, which may change the transmission ratio without further assistance by the operator.

In one embodiment, the power tool is designed as a screwdriver without a striking mechanism.

In one embodiment, the power tool includes a torque clutch, the power tool being in a drilling position without usage of the torque clutch when the provided method is carried out.

The present invention is explained in greater detail below on the basis of the figures.

DETAILED DESCRIPTION OF EXAMPLE EMBODIMENTS

Figure 1:
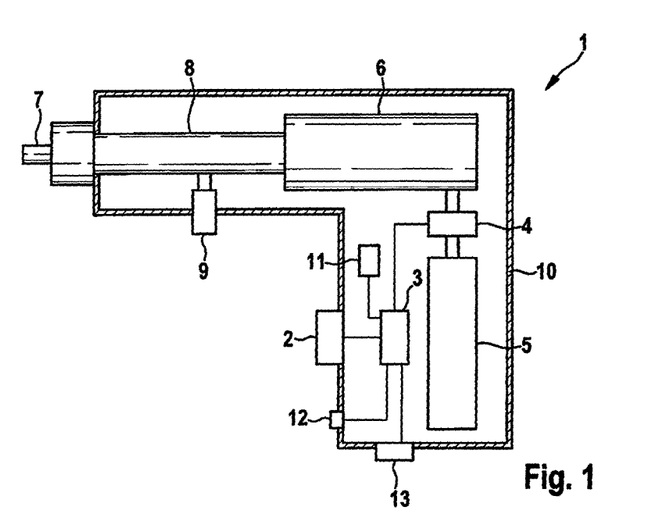
FIG. 1 shows a schematic layout of a power tool.

FIG. 1 shows a schematic illustration of a power tool 1, which includes a housing 10 having a control device 2 for the actuation by an operator. Control device 2 is designed in the form of a pushbutton, for example, the actuation depth of which is detected with the aid of a potentiometer, for example, and relayed to a control unit 3. Control unit 3 is connected to power electronics 4, which control the current and/or voltage supply between a current/voltage source 5 and electric motor 6. Electric motor 6 has an operative connection to a drive 7, and outputs a torque at a corresponding speed of drive 7 as a function of the supplied electric power.

A drill or a screw insert may be installed in drive 7. Moreover, a transmission 8 having a settable transmission ratio may be provided between electric motor 6 and drive 7. Furthermore, a selection switch 9 may be provided, which determines the transmission ratio of transmission 8. Selection switch 9 may be actuated by an operator and may determine a desired transmission ratio of transmission 8. Moreover, control unit 3 is designed and is connected to sensors in order to detect operating parameters of the power tool, for example, a speed of electric motor 6, a torque output by electric motor 6, a voltage of current/voltage source 5, a transmission ratio of transmission 8, or a type of the actuation of the control device, for example, a pressing-in depth.

Control unit 3 is moreover connected to a data memory 11. Control unit 3 is designed to set or regulate the speed of electric motor 6 as a function of the type of the actuation of control device 2. For this purpose, characteristic curves, diagrams, or formulas are stored in data memory 11, which determine an established value for the speed of the electric motor as a function of the type of the actuation of control device 2, which is set with the aid of a regulating method by control unit 3. In the case of a control device 2 in the form of a pushbutton, for example, the value for the speed of the electric motor is increased proportionally to the pressing-in depth. Control unit 3 is moreover connected to a data memory 11, in which control programs and/or characteristic curves and/or limiting values and/or predefined speed ranges and/or predefined torque ranges are stored for values of speed or for slopes of speeds as a function of the increase of the torque or load torque output by the electric motor.

Control unit 3 checks in which speed range electric motor 6 is in and which slope of the speed is provided for the speed range in data memory 11. Control unit 3 regulates the speed of the electric motor in accordance with the slope of the speed predefined in the data memory. For example, the speed assigned according to the actuation of the control device may be reduced corresponding to the stored slope with an increase of the load torque.

In another embodiment, control unit 3 checks in which torque range electric motor 6 is in and whether a slope of the speed is provided in data memory 11 for the torque range. If a slope of the speed is provided for the existing torque range, the electric power established by control unit 3 is established or regulated according to a manner established in data memory 11.

Moreover, a combination of the torque ranges and the speed ranges with slopes of the speed upon an increase of the load torque may also be stored in the data memory, which are taken into consideration by the control unit.

Furthermore, the power tool may be equipped with a further separate operating element 12, using which the parameters in data memory 11 may be changed by the operator.

Moreover, the power tool may include a communication interface 13, using which the parameters in the data memory may be changed by another electrical device. Communication interface 13 may be designed as wired or wireless.

Figure 2:
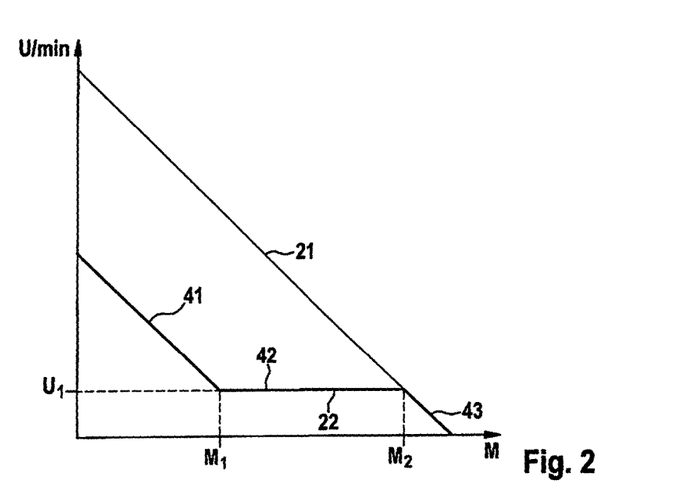
FIG. 2 shows a diagram having a curve of the speed as a function of the output torque.

FIG. 2 shows a schematic view of a speed per minute RPM of electric motor 6 as a function of a torque M, which is output by electric motor 6 and corresponds to the load torque. A first characteristic curve 21 is plotted, which results in the case of a maximum switch position, proceeding from the maximum settable idle speed up to a standstill, with increasing torque, i.e., load torque. Speed U drops with increasing torque, whereby typically characteristic curve 21 has a constant negative slope (delta U to delta M). This behavior is generally achieved by applying the maximum available system voltage.

The newly provided method reduces, in the case of a non-maximum power, the speed in the case of a rising torque in a predefined speed range, which is above a first threshold speed U1. The speed/torque characteristic curve passes through second characteristic curve 22. Second characteristic curve 22 has three different sections 41, 42, 43 having different values for the change of the speed with an increase of the output torque. Second characteristic curve 22 has a first slope proceeding from a maximum speed in a first section 41, i.e., a first decrease of the speed with an increase of the torque until reaching first threshold speed U1.

In the case of a speed below first threshold speed U1, second characteristic curve 22 merges into second section 42. Upon reaching first threshold speed U1, electric motor 6 is driven by control unit 3 and power electronics 4 according to the behavior for the speed stored in the data memory. The power is increased in this case. Therefore, the speed of the electric motor does not decrease further with an increase of the torque, although the output torque increases from a first torque value M1 up to a second torque value M2. Upon reaching second torque M2, the power of electric motor 6 is no longer sufficient to maintain the speed of the electric motor upon a further increase of the torque. The speed decreases and second characteristic curve 22 merges into third section 43. In third section 43, the speed decreases continuously with increasing torque up to a value 0. The speed follows a behavior similar to first characteristic curve 21, for example, in this section. First section 41 and third section 43 of second characteristic curve 22 may have equal negative slopes. The speed may also decrease between first and second torque values M1, M2. The speed range having speeds greater than threshold speed U1 represents an established first speed range. The speed range around threshold speed U1 or below represents a second speed range.

Figure 3:
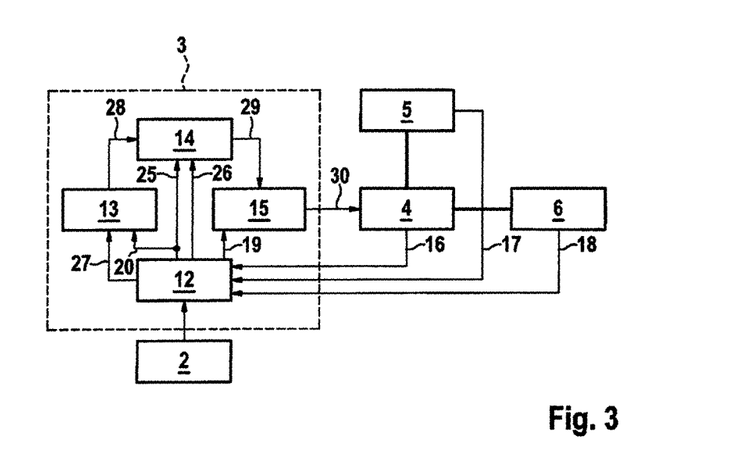
FIG. 3 shows an electrical equivalent circuit diagram of the power tool.

FIG. 3 shows a specific embodiment of an electrical circuit of a control unit 3 for controlling the electric motor according to FIG. 2. Control unit 3 includes a signal processing unit 12, a speed regulator 13, a setpoint current limiter 14, and a current regulator 15. Signal processing unit 12 detects, via a first sensor line 16, the current intensity output by power electronics 4 to electric motor 6. Moreover, signal processing unit 12 detects, via a second sensor line 17, a voltage of current/voltage source 5, which is designed as a battery, for example. Moreover, signal processing unit 12 detects, via a third sensor line 18, a position signal of the electric motor. Signal processing unit 12 relays the value of the voltage of current/voltage source 5 together with the value of the output current of power electronics 4 via a first control line 19 to current regulator 15. Moreover, control unit 3 ascertains a speed of the electric motor on the basis of the position signal and the change with respect to time of the position signal. Signal processing unit 12 relays the speed of the electric motor via a second and a third control line 20, 25 to speed regulator 13 or to setpoint current limiter 14. Moreover, signal processing unit 12 relays the value of the voltage of the current/voltage source via an eighth control line 26 to setpoint current limiter 14.

Furthermore, as a function of the actuation of control device 2 and in particular as a function of the speed of the electric motor and/or the voltage of current/voltage source 5 and/or as a function of the current of power electronics 4, a setpoint speed is ascertained by signal processing unit 12 and the setpoint speed is relayed via fourth control line 27 to speed regulator 13. Speed regulator 13 ascertains a setpoint current as a function of a comparison of the measured speed, i.e., the actual speed, and the setpoint speed. The setpoint current is relayed via a fifth control line 28 to setpoint current limiter 14. Setpoint current limiter 14 ascertains a value for the setpoint current as a function of the measured speed, i.e., the actual speed, and as a function of the measured voltage, i.e., the actual voltage, and/or the measured current, i.e., the actual current. The value for the setpoint current is relayed via a sixth control line 29 to current regulator 15.

Setpoint current limiter 14 accesses data of data memory 11 and may therefore take into consideration the predefined speed ranges and/or torque ranges, in which a predefined slope is predefined for the drop of the speed with an increase of the load torque. Moreover, setpoint current limiter 14 may access characteristic curves, characteristic maps, formulas, etc., which establish the type of the regulation of the speed of electric motor 6 in predefined torque ranges and/or in predefined speed ranges.

Current regulator 15 ascertains, from the setpoint current, which is predefined by setpoint current limiter 14, and the actual value of the current, a pulse-width-modulated signal, which is supplied via a seventh control line 30 to power electronics 4. Power electronics 4 are designed to supply electric motor 6 with electric power from current/voltage source 5 as a function of the control by current regulator 15. The regulating time of the controller may be less than 100 ms, less than 10 ms, or less than 2 ms.

The equivalent circuit diagram shown in FIG. 3 shows a system architecture of a speed regulator having a secondary current control. A setpoint value specification of the speed regulator is generated with the aid of the control electronics from the switch signal, i.e., control device 2. The actual value of the speed is generated with the aid of the rotor position signal and supplied to the speed regulator. The output signal of the speed regulator is the setpoint value for the current regulator. The actual value of the current is supplied to the current regulator. The current regulator computes the value of the pulse width modulation as the output variable and this value is subsequently used to control the power electronics.

The current setpoint value which is generated in the speed regulator is not supplied directly to the current regulator. Instead, the current setpoint value is generated as a function of the actual speed of the motor and preferably as a function of the voltage of current/voltage source 5.

Figure 4:
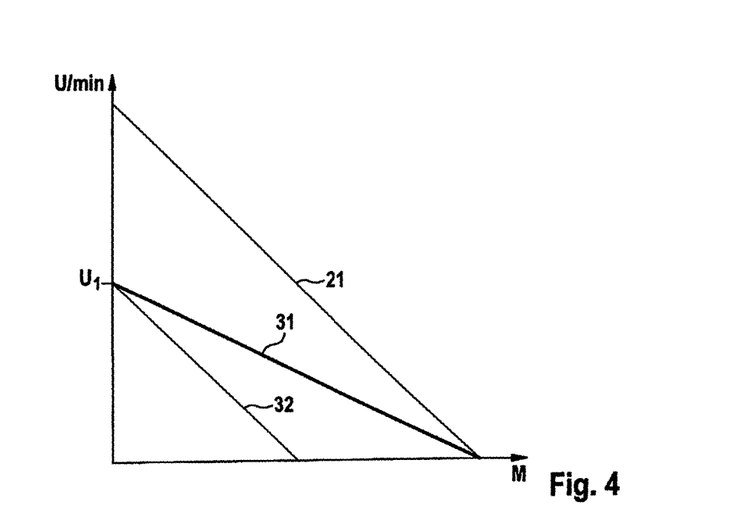
FIG. 4 shows a further speed/torque characteristic curve.

FIG. 4 shows a further diagram of a speed/torque characteristic curve in another implementation of the provided method. First characteristic curve 21 is again shown, which represents a typical control of an electric motor of a power tool having maximum power demand, i.e., having a switch pressed down completely. Depending on the selected specific embodiment, the control unit is designed to control the speed of the electric motor in such a way that a fifth characteristic curve 31 is executed. Fifth characteristic curve 31 has a lesser slope of the change of the speed with increasing torque. In this specific embodiment, a reduced speed is output via the electric motor over the entire speed range. This exemplary embodiment may therefore be considered in such a way that the reduced maximum speed on fifth characteristic curve 31 corresponds to threshold speed U1.

Sixth characteristic curve 32 shows a behavior of the speed with increasing torque, sixth characteristic curve 32 having a greater slope than fifth characteristic curve 31. Both fifth and sixth characteristic curves 31, 32 have an equally large maximum speed U1. Maximum speed U1 is less than a maximum speed according to first characteristic curve 31. In the case of the control of the electric motor according to sixth characteristic curve 32, the electric motor is supplied with less power than in the case of the control using fifth characteristic curve 31.

Figure 5:
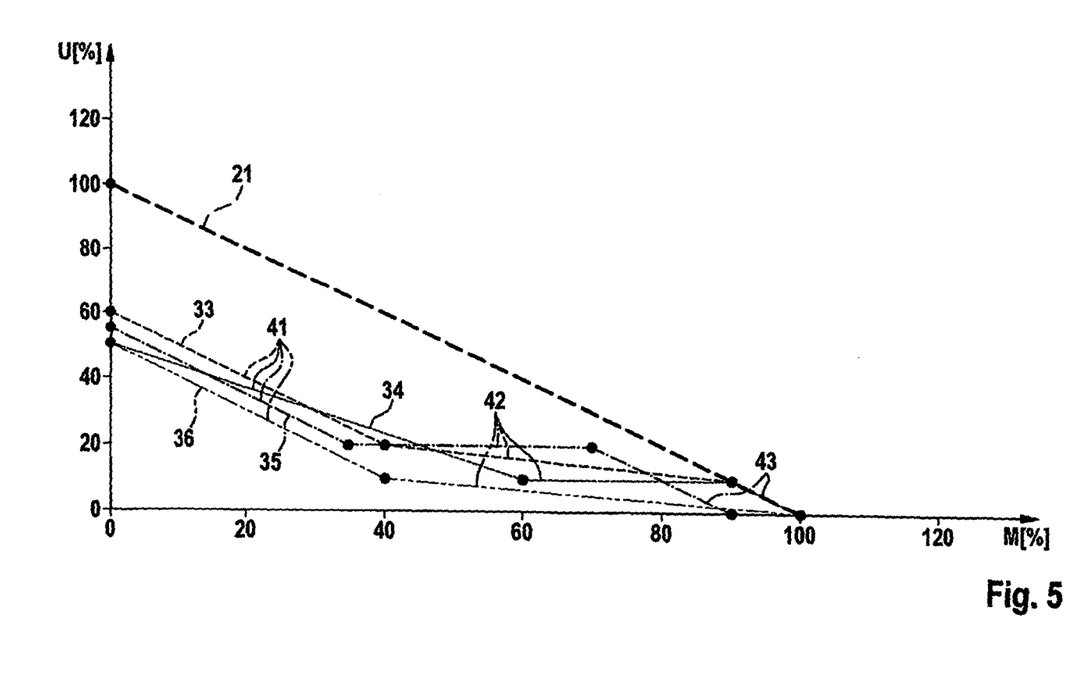
FIG. 5 shows a diagram including further speed/torque characteristic curves.

FIG. 5 shows further characteristic curves for the speeds of the electric motor as a function of the load torque, which may be implemented with the aid of the provided method. First characteristic curve 21 is again shown for the speed for a normal operation of the power tool, in which electric motor 6 of power tool 1 is always operated at the speed desired by the operator, in the illustrated case the maximum speed. Moreover, a seventh characteristic curve 33 for the speed is shown, which has a section 41, a second section 42, and a third section 43. Seventh characteristic curve 33 has a maximum speed of 60% of the maximum speed of first characteristic curve 21. In first section 41, which extends from 0 to 40% of maximum torque M, seventh characteristic curve 33 has a greater negative slope than subsequent second section 42 of seventh characteristic curve 33. Second section 42 of seventh characteristic curve 33 extends from 20% of the maximum speed to approximately 10% of the maximum speed. At approximately 10% of the maximum speed, seventh characteristic curve 33 merges in third section 43 into first characteristic curve 21.

In contrast to the embodiment of the speed/torque characteristic curve of FIG. 2, in second section 42, the speed is not constant, but rather decreases further with an increase of the torque, but not as strongly as in first section 41. In second section 42 of seventh characteristic curve 33, i.e., in the speed range between 20% and 10% of the maximum possible speed, electric motor 6 is supplied with more electric power than in the speed range above 20% of the maximum speed. In the third section of seventh characteristic curve 33, electric motor 6 is supplied with the same electric power as in second section 42, in particular with the maximum possible power.

Eighth characteristic curve 34 for the speed of the electric motor also has three sections 41, 42, 43, which each have a constant negative slope with an increase of the torque. In eighth characteristic curve 34, first section 41 merges at a speed of 15% of the maximum speed into the second section. The speed is kept constant in second section 42, and upon achieving a maximum torque of 90%, a transition is made into first characteristic curve 21. Electric motor 6 is supplied with less than the maximum electric power in the first speed range above 15% of the maximum speed. Electric motor 6 is supplied with maximum electric power in the speed range below 15% of the maximum speed.

Ninth characteristic curve 35 for the speed of the electric motor is also divided into three sections 41, 42, 43, the first section merging into second section 42 at 20% of the maximum speed. In second section 42, the speed is kept constant upon an increase of the torque, until 75% of the maximum torque is achieved. In ranges of 75% of the maximum torque, the curve merges into the third section, at most only 90% of the maximum possible torque being output. In the third section, the negative slope is constant again. In the first speed range above 20% of the maximum speed, electric motor 6 is supplied with less than the maximum electric power. In the speed range around 20% of the maximum speed, electric motor 6 is supplied with higher electric power, in particular with maximum electric power, between 38% of the maximum torque and 75% of the maximum torque. In the torque range above 75% of the maximum torque, the electric power of the electric motor is reduced again, so that only 90% of the maximum torque is achieved.

A tenth characteristic curve 36 for the speed of the electric motor is only divided into two sections, in which the speed decreases from 50% of the maximum speed to 10% of the maximum speed and merges into the second section upon reaching 40% of the maximum torque. In the second section, the speed decreases further to the value 0, at the value 0, 100% of the maximum possible torque being achieved. The reduction of the speed with an increase of the output torque is less in the second section of tenth characteristic curve 36 than in the first section, since in the speed range above 10% of the maximum speed, the electric motor is driven using less than the maximum available power. In the speed range below 10% of the maximum speed, the electric power is increased up to the maximum possible electric power. Instead of the described characteristic curves, further characteristic curves may also be stored in the data memory or computed, to establish the speed as a function of the output torque.

FIG. 6 again shows a schematic view of first characteristic curve 21 for the speed for normal operation of the power tool, in which electric motor 6 of power tool 1 is always operated at the speed desired by the operator, in the case shown the maximum speed. Moreover, different variants of an eleventh characteristic curve 37 for speeds of the electric motor are shown. Depending on the selected specific embodiment, eleventh characteristic curve 37 may merge at various threshold speeds U1, U2, U3, U4 from first section 41 into second section 42. In the case shown here by way of example, the speed is kept constant in second section 42 until reaching first characteristic curve 21. As a function of an operating parameter of the power tool, eleventh characteristic curve 37 may merge at a first threshold speed U1 of 70% of the maximum speed into a second section 42.

Figure 6:
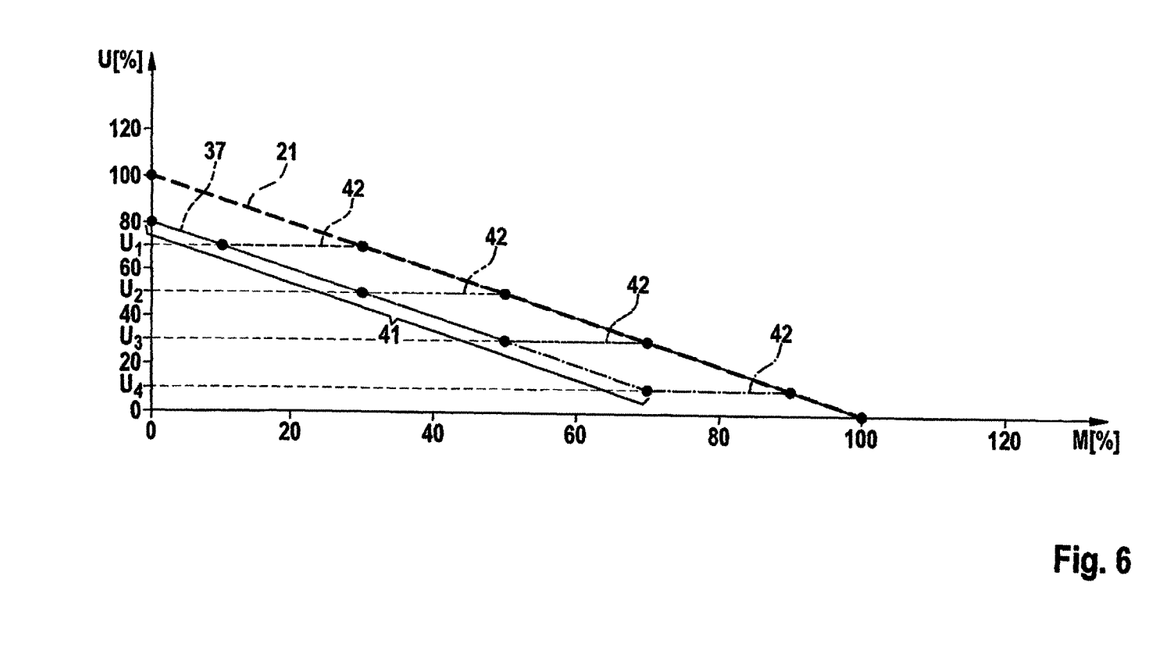
FIG. 6 shows a further diagram including possible speed/torque characteristic curves.

Moreover, characteristic curve 37 may merge at a second threshold speed U2 of 50% of the maximum speed into second section 42 as a function of the selected specific embodiment or as a function of an operating parameter of the power tool. Moreover, as a function of the selected specific embodiment, characteristic curve 37 may merge at a third threshold speed U3 of 30% of the maximum speed into second section 42. Furthermore, as a function of the selected specific embodiment, characteristic curve 37 may merge at a fourth threshold speed U4 of 10% of the maximum speed into second section 42. In the second section, the speed is kept constant until first characteristic curve 21 and therefore the maximum possible power of electric motor 6 is achieved.

Figure 7:
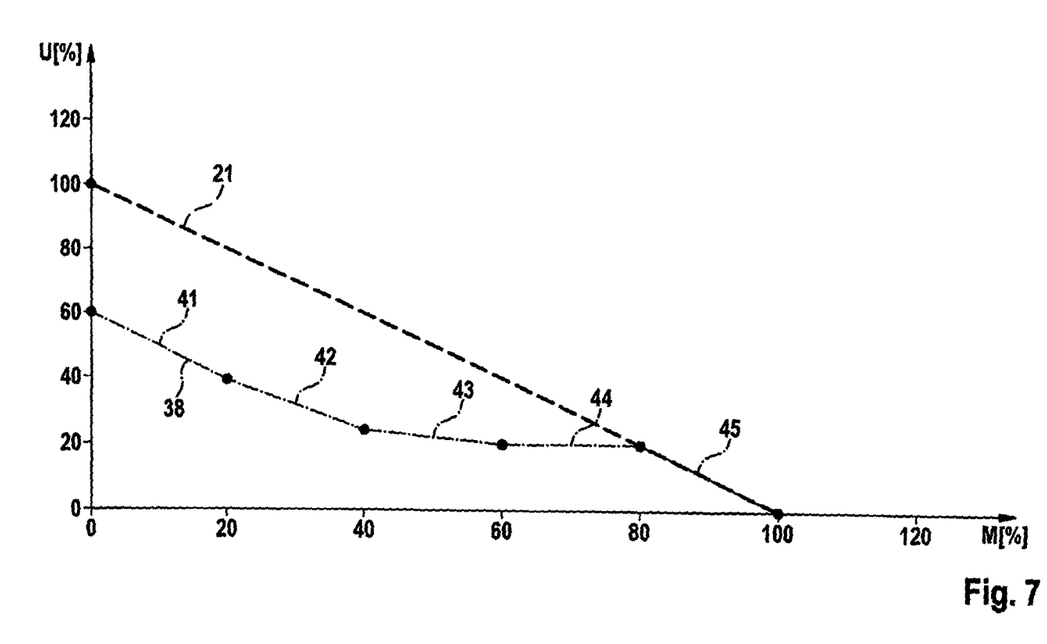
FIG. 7 shows a further diagram including a speed/torque characteristic curve.

FIG. 7 shows first characteristic curve 21 and a twelfth characteristic curve 38 for the speed of the electric motor. Twelfth characteristic curve 38 starts at 60% of the maximum speed and has sections including different negative slopes of the speed with increasing torque. In the specific embodiment shown, first section 41 has the greatest negative slope and merges at 40% of the maximum speed and 20% of the maximum torque into second section 42. Second section 42 has a smaller negative slope than first section 41. Second section 42 merges at 25% of the maximum speed and 40% of the maximum torque into third section 43. Third section 43 has a smaller negative slope than second section 42. Third section 43 merges at a maximum speed of 20% and a maximum torque of 60% into a fourth section 44. Fourth section 44 has a smaller negative slope than third section 43. Third [sic; fourth] section 44 merges at 20% of the maximum speed and 80% of the maximum torque into a fifth section 45. Fifth section 45 has the same negative slope as first characteristic curve 21 and ends at 0% of the speed and 100% of the maximum torque.

Depending on the selected specific embodiment, the characteristic curve used has more or fewer sections including threshold limiting values for the speed ranges, the speeds in the speed ranges having different slopes with an increase of the torque. Moreover, the slopes of the sections of the characteristic curves of the speeds may be of different amounts and may have different values. Depending on the selected specific embodiment, the characteristic curve used by control unit 3 for regulating the speed of the electric motor may have more or fewer threshold speeds with more or fewer sections. The sections of the characteristic curves may have different slopes or equal slopes of different lengths.

Moreover, both the selected speeds or speed characteristic curves and the threshold speeds between speed ranges having different slopes of speed characteristic curves may be a function of parameters of the power tool. For example, the speed characteristic curves, in particular the slopes of the speed characteristic curves and the threshold speeds, may be a function of the voltage of current/voltage source 5, of the selected transmission ratio of transmission 8, and/or of the desired speed request by an operator, i.e., for example, of the pressing depth of a pushbutton which is used as control device 2. For example, the speed characteristic curves, in particular the slopes of the speed characteristic curves and the threshold speeds, may be selected or established by separate operating element 12 and/or by external commands via communication module 13.

Working with power tools, in particular at low speeds, is optimized with the aid of the provided method. In particular, with electrical screwdrivers, in particular with cordless screwdrivers, this method may be advantageous. However, the method may also be used with other power tools, for example, drills, angle grinders, hedge trimmers, saws, etc.

For example, it is thus possible when screwing screws into a workpiece, even with almost countersunk screws, to turn them still further using the most minimal speed setting of the screwdriver and countersink them flush. Variations in the material properties which result in different tightening torques may be essentially avoided. The operator has, due to the provided method and the slow speed used, a relatively long reaction time to end the screw-in procedure upon reaching the desired screw-in depth.

Furthermore, the provided method may also be used for tightening the drill chuck when fastening a drill. Moreover, the provided method may be used for loosening a screw at reduced speed and higher torque. Suddenly reaching a maximum torque may be avoided at the same time. The provided method may be used in particular as a regulating method for both DC and AC electric motors.

With the aid of the provided method, in the case of a power request by the operator which is less than 100% of the maximum torque, a higher torque, in particular 100% of the maximum available torque, may nonetheless be requested if the speed falls below the threshold speed. Jamming of a drill or a screw, for example, in the case of a screw which is already screwed in halfway, is thus avoided.

What is claimed is:

1. A method for regulating a speed of an electric motor of a power tool, the method comprising:
    establishing the speed of the electric motor as a function of an actuation of a control device, the control device being actuated so that a speed is requested which is less than a maximum speed, the speed being set so that, in a first speed range upon an increase of torque output by the electric motor, the speed decreases with a first negative slope, the speed being set in a second speed range so that the speed extends with a second slope upon an increase of the output torque, the second slope being greater than the first slope when considered mathematically;
    wherein a threshold speed is provided, the threshold speed delimiting two speed ranges, the curve of the speed over the torque having different slopes in the two speed ranges.

2. The method as recited in claim 1, wherein, in the first speed range, the speed increases with the first slope upon a decrease of the output torque, and the speed extends with the second slope in the second speed range upon a decrease of the output torque.

3. The method as recited in claim 1, wherein the speed is kept approximately constant in the second speed range, so that the second slope has a value of zero.

4. The method as recited in claim 1, wherein a third speed range is provided, in the third speed range, the speed being set so that with an increase of the output torque, the speed changes with a third slope, the third slope being different from the second slope.

5. The method as recited in claim 4, wherein there is at least one fourth speed range, and wherein in the fourth speed range, the speed of the electric motor is set so that the decrease of the speed with an increase of the output torque is less than in the second speed range.

6. The method as recited in claim 1, wherein a change of the speed with the increase of the torque is a function of an operating parameter of the power tool.

7. The method as recited in claim 6, wherein the operating parameter represents a transmission ratio of a transmission of the power tool.

8. The method as recited in claim 6, wherein the operating parameter represents an actuation of the control device of the power tool.

9. The method as recited in claim 6, wherein the operating parameter represents a voltage of a current supply of the electric motor, the current supply being a battery.

10. The method as recited in claim 6, wherein the operating parameter represents a temperature of the power tool, the temperature being a temperature of at least one of a battery, electronics, and the electric motor.

11. The method as recited in claim 1, wherein the threshold speed is a function of an operating parameter of the power tool.

12. The method as recited in claim 1, wherein one of a ratio between the speed and the output torque, or a threshold speed, is changed via an actuation of an operating element on the power tool.

13. The method as recited in claim 1, wherein one of a threshold speed, or a ratio between the speed and the output torque, is changed via a communication interface.

14. A control unit for regulating an electric motor of a power tool, comprising:
a control module configured to perform the following:
establishing the speed of the electric motor as a function of an actuation of a control device, the control device being actuated so that a speed is requested which is less than a maximum speed, the speed being set so that, in a first speed range upon an increase of the torque output by the electric motor, the speed decreases with a first negative slope, the speed being set in a second speed range so that the speed extends with a second slope upon an increase of the output torque, the second slope being greater than the first slope when considered mathematically;
wherein the control module includes a speed regulator, a setpoint current limiter, and a current regulator.

15. The control unit as recited in claim 14, further comprising:
a signal processing unit, the signal processing unit detecting a current intensity output by power electronics to the electric motor, the signal processing unit detecting a signal for establishing a speed of the electric motor, the signal processing unit relaying a value of an output current of the power electronics to the current regulator, the signal processing unit relaying a value for the speed of the electric motor to the speed regulator and a setpoint current limiter, a setpoint speed being ascertained by the signal processing unit as a function of the actuation of the control device and the setpoint speed being relayed to the speed regulator, the speed regulator ascertaining a setpoint current as a function of a comparison of the ascertained speed and the setpoint speed, the setpoint current being relayed via a fifth control line to the setpoint current limiter, the setpoint current limiter ascertaining a value for the setpoint current as a function of the ascertained speed and the measured current, and the value for the setpoint current being relayed to the current regulator.

16. The control unit as recited in claim 15, wherein the signal processing unit detects a voltage of a current/voltage source, the signal processing unit relaying the value of the voltage of the current/voltage source to the current regulator, and the signal processing unit relaying the value of the voltage of the current/voltage source to the setpoint current limiter, the setpoint current limiter ascertaining a value for the setpoint current as a function of the measured speed and the measured voltage and the measured current.

17. The control unit as recited in claim 16, wherein the setpoint current limiter accesses data of a data memory and takes into consideration the predefined speed ranges, in which a predefined slope is predefined for the behavior of the speed with an increase or decrease of the torque.

18. A power tool, comprising:
a control unit;
an electric motor, the control unit designed to regulate a speed of the electric motor of a power tool, the control unit designed to establish the speed of the electric motor as a function of an actuation of a control device, the control device being actuated so that a speed is requested which is less than a maximum speed, the speed being set so that, in a first speed range upon an increase of torque output by the electric motor, the speed decreases with a first negative slope, the speed being set in a second speed range so that the speed extends with a second slope upon an increase of the output torque, the second slope being greater than the first slope when considered mathematically,
wherein a threshold speed is provided, the threshold speed delimiting two speed ranges, the curve of the speed over the torque having different slopes in the two speed ranges.

19. The power tool as recited in claim 18, further comprising:
a transmission which changes a transmission ratio without further assistance by an operator of the power tool.

20. The power tool as recited in claim 18, wherein the power tool includes a screwdriver without a striking mechanism.

21. The power tool as recited in claim 18, further comprising:
a mechanical or electronic torque clutch;
wherein the power tool is in a drilling position without usage of the torque clutch.

22. A method for regulating a speed of an electric motor of a power tool, the method comprising:
establishing the speed of the electric motor as a function of an actuation of a control device, the control device being actuated so that a speed is requested which is less than a maximum speed, the speed being set so that, in a first speed range upon an increase of torque output by the electric motor, the speed decreases with a first negative slope, the speed being set in a second speed range so that the speed extends with a second slope upon an increase of the output torque, the second slope being greater than the first slope when considered mathematically;
wherein the speed is kept approximately constant in the second speed range, so that the second slope has a value of zero.

23. A method for regulating a speed of an electric motor of a power tool, the method comprising:
establishing the speed of the electric motor as a function of an actuation of a control device, the control device being actuated so that a speed is requested which is less than a maximum speed, the speed being set so that, in a first speed range upon an increase of torque output by the electric motor, the speed decreases with a first negative slope, the speed being set in a second speed range so that the speed extends with a second slope upon an increase of the output torque, the second slope being greater than the first slope when considered mathematically;

wherein one of a ratio between the speed and the output torque, or a threshold speed, is changed via an actuation of an operating element on the power tool.

24. A method for regulating a speed of an electric motor of a power tool, the method comprising:

establishing the speed of the electric motor as a function of an actuation of a control device, the control device being actuated so that a speed is requested which is less than a maximum speed, the speed being set so that, in a first speed range upon an increase of torque output by the electric motor, the speed decreases with a first negative slope, the speed being set in a second speed range so that the speed extends with a second slope upon an increase of the output torque, the second slope being greater than the first slope when considered mathematically;

wherein one of a threshold speed, or a ratio between the speed and the output torque, is changed via a communication interface.

\* \* \* \* \*